(12) United States Patent
Siegel et al.

(10) Patent No.: US 9,937,803 B2
(45) Date of Patent: Apr. 10, 2018

(54) ELECTRIC DIRECT DRIVE FOR AIRCRAFT PROPULSION AND LIFT

(71) Applicants: Rolls-Royce Corporation, Indianapolis, IN (US); Rolls-Royce North American Technologies, Inc., Indianapolis, IN (US)

(72) Inventors: William L. Siegel, Mercersburg, PA (US); Rigoberto J. Rodriguez, Avon, IN (US); Mark J. Blackwelder, Plainfield, IN (US); John T. Alt, Zionsville, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 15 days.

(21) Appl. No.: 15/145,869

(22) Filed: May 4, 2016

(65) Prior Publication Data

US 2016/0325629 A1  Nov. 10, 2016

Related U.S. Application Data

(60) Provisional application No. 62/157,050, filed on May 5, 2015.

(51) Int. Cl.
| | |
|---|---|
| *B60L 11/02* | (2006.01) |
| *B61C 9/38* | (2006.01) |
| *B60L 11/12* | (2006.01) |
| *B64D 27/24* | (2006.01) |
| *B64D 35/02* | (2006.01) |

(Continued)

(52) U.S. Cl.
CPC .............. *B60L 11/12* (2013.01); *B64D 27/24* (2013.01); *B64D 35/02* (2013.01); *B60L 2200/10* (2013.01); *Y02T 50/44* (2013.01); *Y02T 50/62* (2013.01)

(58) Field of Classification Search
USPC .................................. 290/45; 318/717, 719
See application file for complete search history.

(56) References Cited

U.S. PATENT DOCUMENTS

| | | |
|---|---|---|
| 1,511,448 A | 10/1924 | Drum |
| 2,462,201 A | 2/1949 | Kilgore et al. |

(Continued)

FOREIGN PATENT DOCUMENTS

| | | |
|---|---|---|
| DE | 102010021026 A1 | 11/2011 |
| WO | WO-2014158240 A2 | 10/2014 |

OTHER PUBLICATIONS

European Search Report dated Nov. 7, 2016 issued in EP Patent App No. 16168148.1.
English translation of Abstract for DE 10 2010 021 026.

*Primary Examiner* — Pedro J Cuevas
(74) *Attorney, Agent, or Firm* — Fishman Stewart PLLC

(57) ABSTRACT

The present disclosure provides an apparatus with a prime mover coupled to a generator that is directly electrically coupled to an electric motor. A propeller or fan may be coupled to and driven by the electric motor. A bi-directional power converter may be coupled to the generator and further coupled to an energy storage device. The energy storage device may be selectively coupled to the electric motor. Methods of using the apparatus are also provided.

17 Claims, 1 Drawing Sheet

(51) Int. Cl.
*H02P 1/46* (2006.01)
*H02P 3/18* (2006.01)

(56) References Cited

U.S. PATENT DOCUMENTS

| | | | | |
|---|---|---|---|---|
| 4,269,073 | A * | 5/1981 | McIntyre | G01C 19/065 318/714 |
| 4,554,989 | A | 11/1985 | Gruich et al. | |
| 4,605,185 | A | 8/1986 | Reyes | |
| 4,804,156 | A | 2/1989 | Harmon | |
| 6,294,886 | B1 * | 9/2001 | Gibard | B60L 5/42 180/65.31 |
| 7,208,908 | B2 * | 4/2007 | Anghel | H02P 9/009 318/400.02 |
| 7,227,271 | B2 * | 6/2007 | Anghel | F02N 11/04 290/31 |
| 7,292,003 | B1 * | 11/2007 | Baker | H02P 9/007 318/400.34 |
| 7,555,893 | B2 | 7/2009 | Okai et al. | |
| 8,238,130 | B2 * | 8/2012 | Wiegman | B60L 11/1868 363/131 |
| 8,410,733 | B2 * | 4/2013 | Ranganathan | H02P 4/00 318/400.01 |
| 9,654,030 | B2 * | 5/2017 | Gontermann | H02P 6/08 |
| 2002/0145076 | A1 | 10/2002 | Alford | |
| 2006/0006829 | A1 * | 1/2006 | Anghel | H02P 9/009 318/719 |
| 2006/0011780 | A1 | 1/2006 | Brand et al. | |
| 2006/0061336 | A1 * | 3/2006 | Anghel | F02N 11/04 322/59 |
| 2008/0006739 | A1 | 1/2008 | Mochida et al. | |
| 2010/0080030 | A1 * | 4/2010 | Wiegman | B60L 11/1868 363/131 |
| 2010/0125383 | A1 * | 5/2010 | Caouette | B63H 21/17 701/21 |
| 2010/0253254 | A1 * | 10/2010 | Ranganathan | H02P 4/00 318/400.09 |
| 2010/0253255 | A1 * | 10/2010 | Ranganathan | H02P 4/00 318/400.09 |
| 2011/0080040 | A1 | 4/2011 | Kumar | |
| 2016/0023773 | A1 | 1/2016 | Himmelmann | B64D 27/10 60/778 |
| 2016/0036356 | A1 * | 2/2016 | Gontermann | H02P 6/08 318/431 |
| 2016/0176534 | A1 * | 6/2016 | Himmelmann | B64D 35/02 290/45 |
| 2017/0133961 | A1 * | 5/2017 | Akimatsu | H02P 6/10 |
| 2017/0275013 | A1 * | 9/2017 | Armstrong | B64D 35/02 |

* cited by examiner

ELECTRIC DIRECT DRIVE FOR AIRCRAFT PROPULSION AND LIFT

CROSS-REFERENCE TO RELATED APPLICATIONS

This application is a non-provisional application claiming priority to U.S. Provisional Application No. 62/157,050 filed May 5, 2015, which is hereby incorporated by reference in its entirety.

TECHNICAL FIELD

The present disclosure generally relates to electrically powered aircraft propulsion and lift, and more particularly, but not exclusively, to electric direct drives for aircraft propulsion and lift.

BACKGROUND

Alleviating difficulties found in electrically powered aircraft propulsion and lift remains an area of interest. Present approaches to this suffer from a variety of limitations and disadvantages relative to certain applications. For instance, current applications in this field can be heavy and take up a high volume of space within the aircraft, making their application prohibitive. Accordingly, there is a need for further contributions to this technology.

SUMMARY

One embodiment of the present disclosure is a unique electric direct drive for aircraft propulsion and lift. Other embodiments include apparatuses, systems, devices, hardware, and methods of use thereof. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
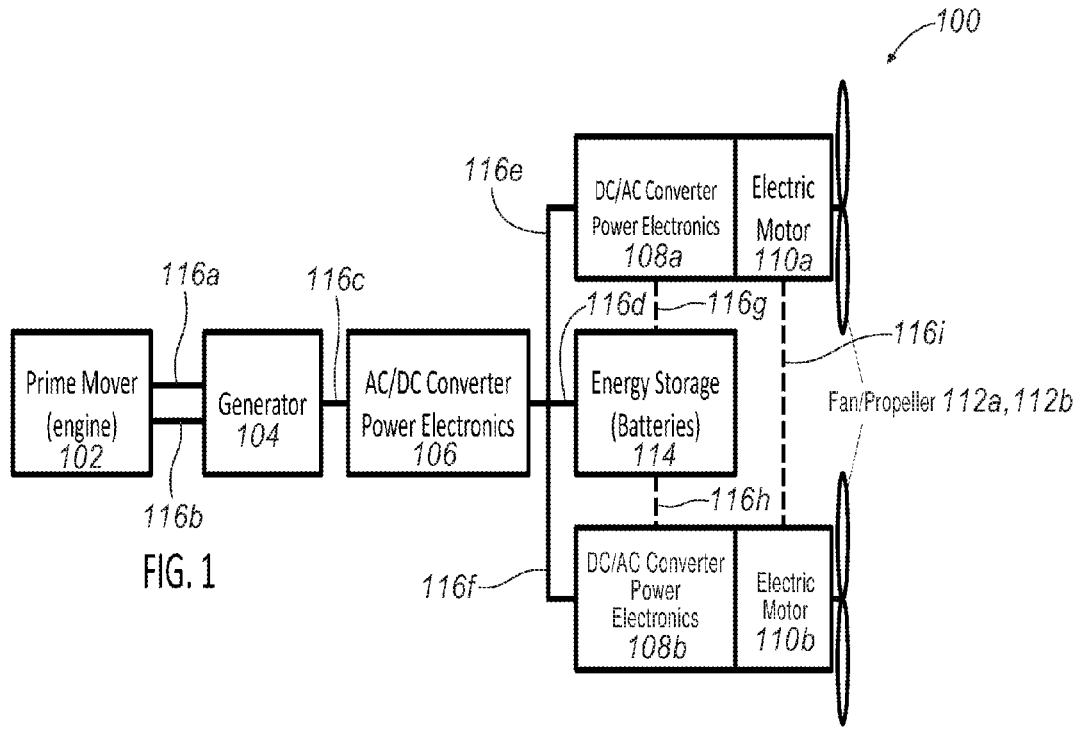
FIG. 1 is a schematic representation of an electric drive for aircraft propulsion and lift.

For the purposes of promoting an understanding of the principles of the present disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, a schematic diagram for system 100 with an electric propulsion/lift drive is provided. This embodiment of system 100 may utilize large bulky, heavy, complex, and expensive power electronics to regulate the power flow from the electric generators 104 to electric motors 110a, 110b that provide either propulsion or lift capabilities for an airborne platform. The power electronics equipment converts the output of the generators(s) 104 (e.g., voltage, current, and frequency) to the specific needs of the electric motor(s) 110a,110b (e.g., voltage, current, and frequency). Power electronic "state of the art" metrics show that the power density ranges from 3-5 kW/kg and the specific density ranges from 5-7 kW/liter. Lift and propulsion power requirements for the embodiments of traditional airborne platforms may be quite high, thus making the weight and volume required for power electronics under this concept prohibitive.

As shown in FIG. 1, a prime mover 102, which may be an engine, is coupled to a generator 104. The generator 104 is electrically coupled to an AC/DC converter 106, such a rectifier. Each electric motor 110a, 110b, which drive the fan/propellers 112a, 112b, are connected to the AC/DC converter 106 through a DC/AC converter 108a, 108b. An energy storage device 114 may also be supplied to the system 100. System 100 may include prime mover 102, generator 104, AC/DC converter power electronics 106, converter 108a, 108b, 108b, electric motor 110a, 110b, fan/propeller 112, 112b, energy storage 114, and connections 116. Connections 116 may include connections 116a-i between the respective components of system 100.

Figure 2:
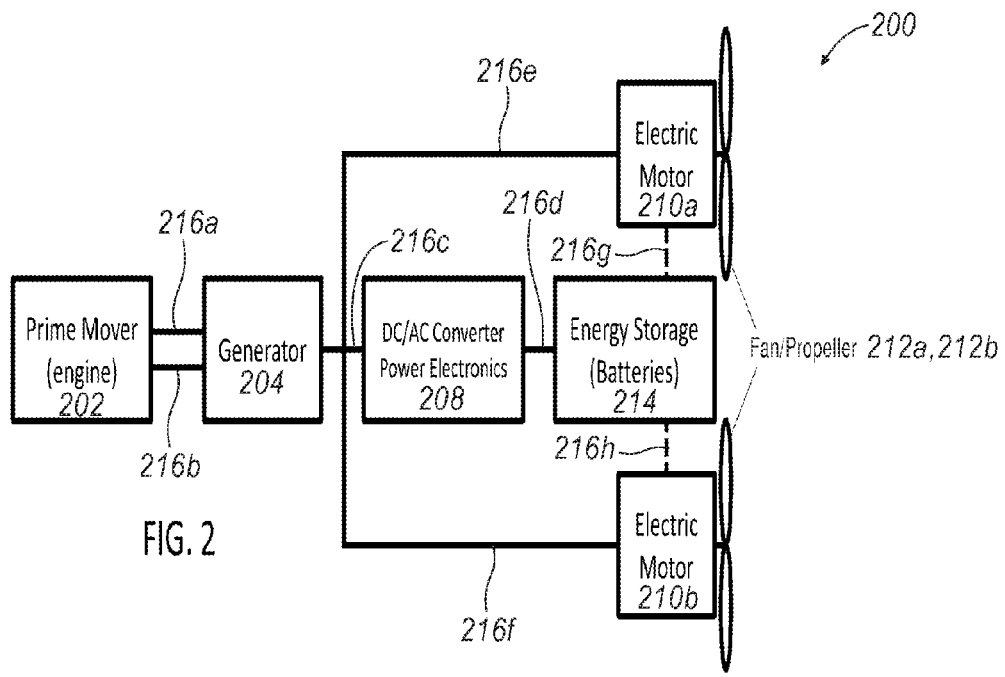
FIG. 2 is a schematic representation of an embodiment of an electric direct drive for aircraft propulsion and lift as disclosed herein.

Referring now to FIG. 2, a schematic diagram of an example embodiment of system 200 with an electric propulsion/lift drive of the present disclosure is provided. The system 200 may eliminate much of the power electronics that have previously been utilized in traditional systems. This is accomplished, for example, by powering motors 110a, 110b (e.g., propulsion/lift fan motors) directly from the power generator 104.

System 200 may include prime mover 202 (e.g., an engine such a gas turbine engine), a generator 204 (e.g., a polyphase electric generator), a converter 208 (e.g., DC/AC converter power electronics), motors 210a, 210b (e.g., an electric motor such as a polyphase synchronous motor), fan/propeller 212a, 212b, and energy storage 214 (e.g., one or more batteries), and one or more connections 216. Connections 216 may include direct or indirect connections operatively and electrically coupling or connecting the components of system 200. Connections 216a, 216b may connect prime mover 202 and generator 204. Connection 216c may connect generator 204 and converter 208. Connection 216d may connect converter 208 and energy storage 214. Connections 216e, 216f may connect generator 204 and motors 210a, 210b. Connections 216g, 216h may connect motor 210a, 210b and energy storage 214.

As shown, a direct connection 216e, 216f is provided between generator 204 (e.g., a polyphase electric generator) to electric motor 210a, 210b (e.g., a polyphase synchronous motor). The polyphase electric generator 204 may be, for example, a synchronous or asynchronous permanent magnet or a wound field synchronous electric generator. The polyphase synchronous motor 210a, 210b may be, for example, a permanent magnet or wound field synchronous motor. A prime mover 202 such as, for example, a gas turbine engine or a reciprocating piston internal combustion engine drives the generator. The electric motor 210a, 210b drives the fan/propeller 212a, 212b for lift and/or horizontal propulsion.

The motor speed of motor 210a, 201b, and, thus, the fan/propeller speed of fan/propeller 212a, 212b, may be controlled by varying the speed of the prime mover 202, which is coupled to the generator 204. The speed of the generator 204 directly determines the output voltage, current, and frequency, which determines the speed of the motor 210a, 210b driving the fan/propeller 212a, 212b. In the case of a wound field generator or motor, the speed can be controlled by varying the field excitation.

For emergency purposes, the system 200 may include a small energy storage device/component(s) 214 with a bi-directional power converter 208. The energy storage device/component(s) 214 may be an engine generator, one or more batteries, or a combination thereof. The bi-directional power converter 208 may be, for example, a DC/AC converter. The bi-directional power converter 208 may rectify the AC power from the generator 204 to DC power to charge the energy storage device 214. Then when emergency power was needed, the bi-directional power converter 208 would invert the DC power from the energy storage device 214 to AC power for the electric motors 210a, 210b. The energy storage device/component(s) 214 would only be required to carry sufficient energy to safely deliver the airborne platform from operating altitude to the ground.

System 200 may include an apparatus. System 200 may include prime mover 202 coupled to generator 204, one or more electric motor 210a, 210b directly electrically coupled to generator 204, one or more propeller 212a, 212b coupled to and driven by one or more electric motors 210a, 210b, converter 208 (e.g., a bi-directional power converter) coupled to generator 204 and further coupled to energy storage device 214. Energy storage device 214 may be selectively coupled to the one or more electric motors 210a, 210b. Motors 210a, 210b may include a polyphase synchronous motor, a wound field synchronous motor, or a combination thereof. Generator 204 may include is a wound field synchronous polyphase electric generator, a permanent magnet polyphase electric generator, or a combination thereof. Energy storage device 214 may include one or more batteries, an engine generator, or a combination thereof.

System 200 may include an aircraft propulsion or lift system. System 200 may include an aircraft housing one or more prime movers 202 that are coupled to one or more generators 204 (e.g., polyphase electric generators), one or more motors 210a, 210b (e.g., polyphase electric motors) directly electrically coupled to the generators 204, propeller 212a, 212b coupled to and driven by respective motors 210a, 210b, and power converter 208 (e.g., a bi-directional power converter) coupled to the generators 204 and further coupled to energy storage device 214. Energy storage device 214 may be selectively coupled to the electric motors 210a, 210b.

Methods of using system 200 are also contemplated. A method may include coupling a prime mover 202 that is housed in an aircraft to electric generator 204 that is directly electrically coupled to electric motor 210a, 210b. The method may further include varying the speed of the electric motor 210a, 210b via variations in at least one of a speed of the prime mover 202 and a field excitation.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosures are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus of an aircraft propulsion system, comprising:
    a prime mover coupled to a generator;
    an electric motor directly electrically coupled to said generator;
    a propeller coupled to and driven by said electric motor; and
    a bi-directional power converter coupled to said generator and further coupled to an energy storage device;
    wherein said energy storage device is selectively coupled to said electric motor, and
    wherein said energy storage device comprises an engine generator.

2. The apparatus of claim 1, wherein said electric motor is a polyphase synchronous motor.

3. The apparatus of claim 1, wherein said electric motor is a wound field synchronous motor.

4. The apparatus of claim 1, wherein said generator is a wound field synchronous polyphase electric generator.

5. The apparatus of claim 1, wherein said generator is a permanent magnet polyphase electric generator.

6. The apparatus of claim 1, wherein said energy storage device comprises one or more batteries.

7. An aircraft propulsion system comprising:
    one or more prime movers coupled to one or more polyphase electric generators;
    one or more polyphase electric motors directly electrically coupled to said one or more polyphase electric generators;
    a propeller coupled to and driven by each of said one or more polyphase electric motors; and
    a bi-directional power converter coupled to said one or more polyphase electric generators and further coupled to an energy storage device;
    wherein said energy storage device is selectively coupled to said one or more polyphase electric motors, and
    wherein said energy storage device comprises an engine generator.

8. The aircraft propulsion system of claim 7, wherein said one or more prime movers are gas turbine engines.

9. The aircraft propulsion system of claim 7, wherein said one or more polyphase electric generators are wound field synchronous generators.

10. The aircraft propulsion system of claim 7, wherein said one or more polyphase electric motors are wound field synchronous motors.

11. The aircraft propulsion system of claim 7, wherein said energy storage device comprises one or more batteries.

12. A method of an aircraft propulsion system, comprising:
    coupling a prime mover that is housed in an aircraft to an electric generator that is directly electrically coupled to an electric motor;

varying the speed of the electric motor via variations in at least one of a speed of the prime mover and a field excitation; and providing an energy storage device including an engine generator.

13. The method of claim 12, wherein the electric motor includes at least one of a wound field electric motor.

14. The method of claim 12, wherein said electric motor includes at least one of a polyphase synchronous motor and a wound field synchronous motor.

15. The method of claim 12, wherein said generator is a wound field synchronous polyphase electric generator.

16. The method of claim 12, wherein said generator is a permanent magnet polyphase electric generator.

17. The method of claim 12, wherein said energy storage device comprises one or more batteries.

* * * * *